United States Patent
Behn et al.

[15] 3,665,268
[45] May 23, 1972

[54] IMPREGNATED ELECTRICAL CAPACITOR

[72] Inventors: Reinhard Behn, Munich; Karl-Heinz Preissinger, Taufkirchen; Reiner Simson, Munich, all of Germany

[73] Assignee: Siemens Aktiengesellschaft, Berlin and Munich, Germany

[22] Filed: May 6, 1971

[21] Appl. No.: 140,867

[30] Foreign Application Priority Data

May 12, 1970 Germany......................P 20 23 193.0

[52] U.S. Cl..............................................317/258, 317/260
[51] Int. Cl. .........................................................H01g 1/00
[58] Field of Search..........................................317/260, 258

[56] References Cited

UNITED STATES PATENTS 3,215,909  11/1965  Schill..................................317/260 X
3,346,789  10/1967  Robinson...............................317/258

Primary Examiner—E. A. Goldberg
Attorney—Hill, Sherman, Meroni, Gross & Simpson

[57] ABSTRACT

An impregnated capacitor which has an especially coiled body of alternate layers of an insulating band such as paper and a pair of plastic dielectric bands such as polypropylene bands with one charge-carrying layer being formed by metalized surface coatings on the insulating band and the other charge-carrying later being formed by facing surface coatings on each of the pair of dielectric bands. The entire coiled body is impregnated with an oil to remove any air gaps between the layers by causing the swelling of the plastic dielectric bands.

4 Claims, 1 Drawing Figure

Patented May 23, 1972  3,665,268
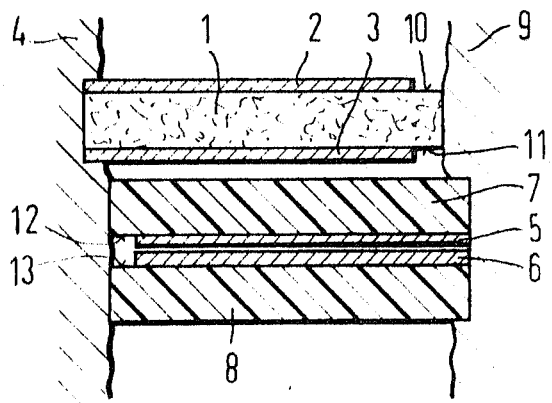
INVENTORS
Reinhard Behn
Karl-Heinz Preissinger
Reiner Simson
BY Hill, Sherman, Meroni, Gross & Simpson  ATTYS.

3,665,268

IMPREGNATED ELECTRICAL CAPACITOR

BACKGROUND OF THE INVENTION

1. Field of the Invention

The present invention relates to an impregnated electrical capacitor especially having a coil capacitor body.

2. Description of the Prior RT

It has been suggested to form an electrical condenser or capacitor with a coiled body with one charge-carrying layer or electrode provided as metal surface coatings on a rough surface of an insulating material band or foil such as paper which is wound with a pair of dielectric bands or foils one of which has the other charge-carrying layer provided as a surface coating thereon. The rough surface of the one electrode provides spaces between the electrode and one of the dielectric band to enable penetration of an impregnating agent from the edges of the coiled body into and between the wound layers. However, the smooth surfaces of the dielectric bands form air gaps or spaces of such a size that the impregnating agent can not penetrate between the surfaces of the pair of dielectric bands to fill the air gaps. In such a capacitor, the air gaps are eliminated by using an evacuating method; however, it is not always possible to eliminate all the gaps from the wound body and the remaining gaps are positioned between charge-carrying layers of different potentials and can enable a spraying phenomena or corona discharge in the wound body which is undesirable.

SUMMARY OF THE INVENTION

The present invention is directed to an impregnated electrical capacitor or condenser having an especially coiled body in which air gaps or spaces remaining after impregnation with an evacuating method are rendered harmless. The structure of the body of the capacitor has one charge-carrying layer or electrode formed by interconnected metal surface coatings on a band of insulating material and the other charge-carrying layer is formed by a pair of metal surface coatings superimposed between a pair of dielectric bands with each dielectric band having one of the surface coatings so that air gaps between the two coatings on the dielectric bands are in a area or space which is free from electrical field or charge due to the coatings being electrically interconnected. The two adjacent coatings on the dielectric bands are interconnected at one edge of the band and are spaced from the other edge to provide insulation from a connecting mean which connects the layers of the one charge-carrying layer provided on the insulating material. Preferably, the band of the insulating material is a paper band having the metal surface coating on both surfaces and the dielectric bands are polypropylene plastic bands which swell when impregnated by the impregnating agent to reduce the formation of air gaps between the dielectric bands and the paper band.

Accordingly it is an object of the present invention to provide impregnated electrical capacitor in which spacings between the dielectric bands forming air gaps or spaces are harmless since they are between coatings of the capacitor which are at the same potential.

Another object of the present invention is to provide an impregnated electrical capacitor in which the time for impregnation is reduced due to limiting the spaces requiring the penetration of the impregnating agent.

Other objects, features and advantages of the present invention will be readily apparent from the following description of the preferred embodiment thereof taken in conjunction with the accompanying drawing although variations and modifications may be effected without departing from the spirit and scope of the novel concept of the disclosure.

BRIEF DESCRIPTION OF THE DRAWING

The FIGURE illustrates a portion of a cross section of a coiled body of a capacitor of the present invention.

DESCRIPTION OF THE PREFERRED EMBODIMENT

The principles of the present invention are particularly useful when employed in a coiled capacitor having a body formed by winding or coiling three bands or foils 1, 7 and 8 together. The band or foil 1 of insulating material, such as paper, is provided on both surfaces with self-healing metal surface coatings or layers 2 and 3 to form one of a pair of charge-carrying layers. The other electrode or charging layer comprises a pair of surface coatings 5 and 6 which are self-healing metal coatings and which are applied on one side of dielectric foils or bands 7 and 8, respectively.

The coatings 2 and 3 are electrically interconnected by a means such as a contact layer or edge coating 4, and the coatings 5 and 6 are electrically connected by a second edge coating or contact layer 9. The coatings 4 and 9 are applied to opposite edges of the coiled body by suitable means such a metalizing process. The coatings 2, 3, 5 and 6 can also be applied to their respective bands 1, 7 and 8 by a metalizing process.

To insulate the coatings 2 and 3 of the first charge-carrying layer on the paper band 1, from the contact layer 9, the surfaces of the band 1 adjacent one edge are free of the metal coatings 2 and 3 to provide edge portions 10 and 11 which insulate the metal surface coatings 2 and 3 from the contact layer 9. In a similar manner, both of the dielectric bands 7 and 8 adjacent one edge have surfaces free of the metal coatings 5 and 6 to provide surface portions 12 and 13 which insulate the coatings 5 and 6 from the contact layer 4.

As illustrated, the paper band 1 and the two dielectric bands 7 and 8 are arranged with the metal surface coatings 5 and 6 in a facing relationship and separated from the metal coatings 2 and 3 on the band 1 by the dielectric bands 7 and 8, respectively. The bands 1, 7 and 8, as arranged in the drawing, are wound with the desired tension to form the coiled body with the desired compactness. After winding, the condenser body is impregnated from the edges with an impregnating agent introduced through the gaps or spaces which are formed between the raw surfaces 11 or 10 of the paper band and the plastic bands 7 and 8 and gaps formed by the surface portions 12 and 13. The impregnating agent such as oil will proceed from the edges in between the bands of the body.

The spacing between the two adjacent metal coatings 5 and 6 is so small that no impregnating agent can penetrate therebetween and the spacing between the layers 5 and 6 is such that it can not always be eliminated even by utilizing an evacuating method with the step of impregnating. However, the presence of air gaps between the bands 5 and 6 will not affect the operation of the capacitor since the metal coatings 5 and 6 are electrically connected by the edge layer 9 and the air gaps therebetween are located in an area free of an electrical field or voltage potential. The space between the dielectric band 7 and the metal coating 3 of the paper band 1 is filled by the swelling of the dielectric band such as 7 caused by the impregnating agent. Thus, the electrical capacitor of the invention is free from air gaps in those areas which would result in a corona discharge when used in an alternating current operation.

The dielectric bands 7 and 8 are preferably formed of a polypropylene foil or band which is suitable as a dielectric and will swell when subjected to an impregnating agent such as an insulating oil. An insulating oil which is particularly useful as an impregnating agent comprises approximately 15 to 20 per cent of aromatic components which will bind with hydrogen, about 30 per cent naphtenic components, and between 50 and 60 per cent paraffinic components. Such an insulating oil is sold under the trade name of "Shell K 8".

Although various modifications might be suggested by those versed in the art, it should be understood that we wish to embody within the scope of the patent awarded hereon all such modifications which reasonably and properly come within the scope of our contribution to the art.

We claim as our invention:

1. An impregnated electrical capacitor comprising a body formed by a pair of charge-carrying layers separated by a plastic dielectric material, one of the layers being a pair of interconnected metal surface coatings on a band of insulating material, the other layer being a pair of metal surface coatings superimposed between dielectric bands of plastic material with each dielectric band having one of the metal surface coatings of the other layer, said dielectric band being arranged with the pair of metal surface coatings in a facing relationship, and means for forming a separate electrical connection with each of said layers so that the pair of metal surface coatings on the plastic bands are insulated from the pair of metal surface coatings on the band of insulating material by the dielectric bands.

2. An impregnated electrical capacitor according to claim 1, wherein the band of insulating material is a paper band and wherein the pair of dielectric bands are polypropylene plastic material.

3. An impregnated electrical capacitor according to claim 1, wherein the dielectric bands are swelled by the impregnating agent to remove air gaps and spaces between the dielectric bands and the one layer.

4. An impregnated electric capacitor according to claim 1, wherein the band of insulating material adjacent one edge thereof is free of the metal surface coatings to provide surface portions free of the surface coating at said one edge, wherein each of said pair of dielectric bands adjacent one edge thereof is free of the metal surface coatings to provide surface portions free of the surface coating at said one edge of each of said dielectric bands, said dielectric bands and said band of insulating material being arranged with their surface portions facing in opposite directions, and wherein said means for connecting includes a pair of edge coatings on the coiled body with one edge coating electrically interconnecting the coatings of said one layer and insulated from the coatings of said other layer, and the other edge coating electrically interconnecting the coatings of said other layer and insulated from the coatings of said one layer.

* * * * *